United States Patent [19]

Gondouin

[11] Patent Number: 5,052,482
[45] Date of Patent: Oct. 1, 1991

[54] CATALYTIC DOWNHOLE REACTOR AND STEAM GENERATOR

[75] Inventor: Michel Gondouin, San Rafael, Calif.

[73] Assignee: S-Cal Research Corp., San Rafael, Calif.

[21] Appl. No.: 510,596

[22] Filed: Apr. 18, 1990

[51] Int. Cl.⁵ .................... E21B 34/14; E21B 43/12; E21B 43/24

[52] U.S. Cl. ........................ 166/50; 166/57; 166/272; 166/300; 166/303; 166/373

[58] Field of Search ............... 166/272, 303, 256, 261, 166/50, 59, 332, 322

[56] References Cited

U.S. PATENT DOCUMENTS

| | | | |
|---|---|---|---|
| 3,595,316 | 7/1971 | Myrick, III | 166/303 |
| 4,237,973 | 12/1981 | Todd | 166/59 |
| 4,372,386 | 2/1983 | Rhoades et al. | 166/303 X |
| 4,501,326 | 2/1985 | Edmunds | 166/50 X |
| 4,674,575 | 6/1987 | Guess | 166/332 |
| 4,706,751 | 11/1987 | Gondouin | 166/272 |
| 4,766,960 | 8/1988 | Williamson, Jr. | 166/332 X |

Primary Examiner—Stephen J. Novosad

[57] ABSTRACT

A Downhole catalytic Methanator reactor assembly is hung within the cemented casing of a vertical well for the purpose of producing large volumes of high quality steam and oil soluble gases for injection into horizontal drainholes drilled into a deep Heavy Oil reservoir, in order to make the Heavy Oil more mobile. Steam is generated in part by the heat of chemical reactions taking place within the reactor assembly. The exothermic Methanation reaction takes place within a fixed bed of catalyst particles, at a temperature below 800° F., when a Syngas feed (H2,CO and/or CO2) comes in contact with a catalyst. Boiler feed water supplied to the reactor assembly from the surface is vaporized in boiler-type water tubes immersed in the catalytic bed, or by direct contact with the catalyst and with the hot gas phase flowing through the bed. The Syngas feed may be supplied to the reactor from the surface, or made directly by Partial Oxidation of Natural Gas in Oxygen within the downhole assembly. The reactor assembly may also be located within a cemented metal-lined cavity under-reamed below a cased access well.

For operating each of the horizontal drainholes successively in the cyclic ("huff and puff") mode, a downhole valve section is included in the assembly. Multi-way downhole retrievable valves are used for this purpose.

This apparatus presents the advantage of largely reducing the steam heat losses in surface lines and in well tubings.

19 Claims, 13 Drawing Sheets

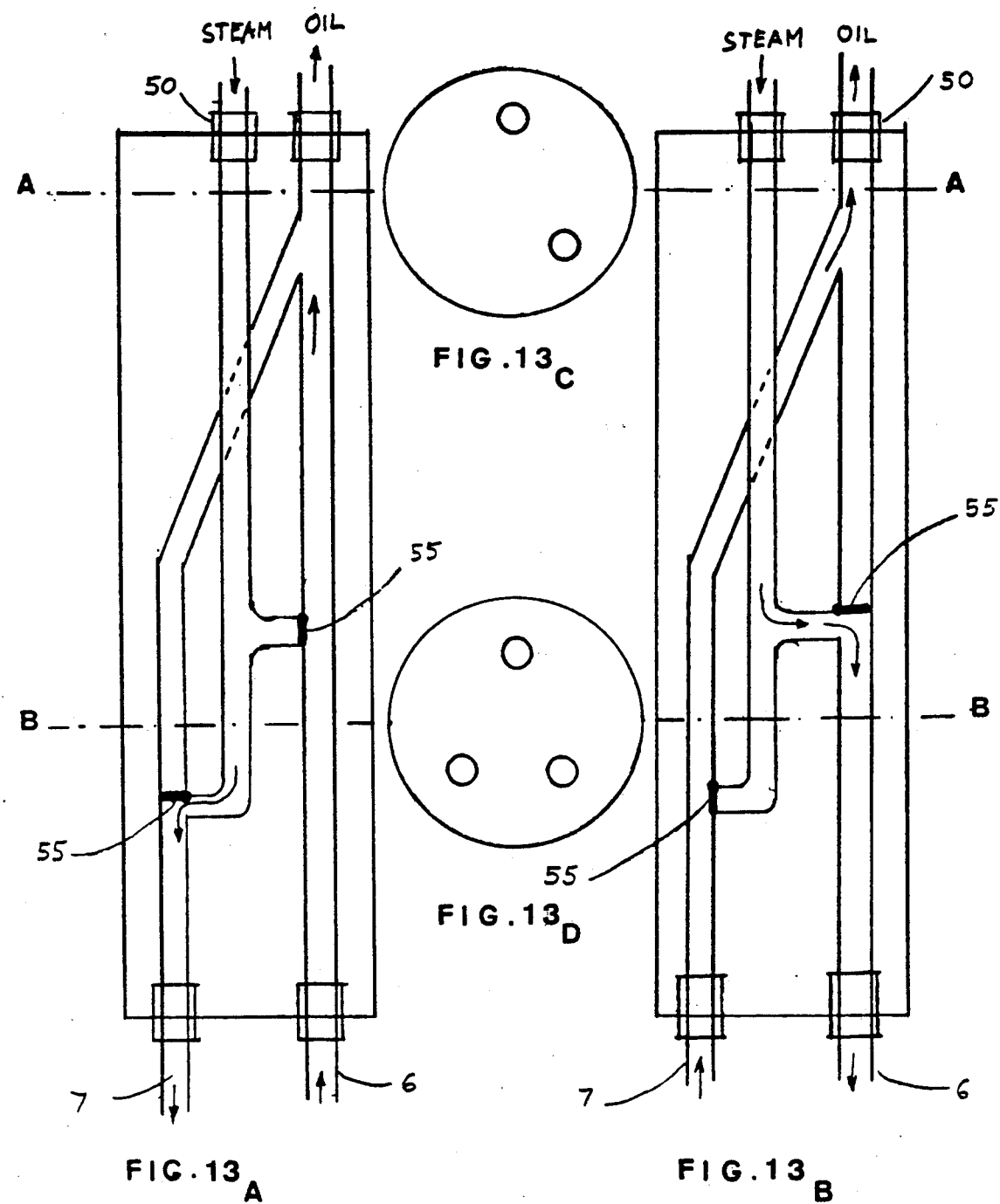

CATALYTIC DOWNHOLE REACTOR AND STEAM GENERATOR

FIELD OF INVENTION

U.S. Pat. No. 4,706,751 teaches that heavy oil can be recovered from deep reservoirs by a process using various exothermic catalytic reactions to generate downhole high quality steam and hot gases for continuous or cyclic injection into a horizontal well. The present invention pertains to a Downhole Reactor and Steam Generator in which the exothermic catalytic reaction is that of Methanation. The reactor is supplied with Syngas, a mixture of H2, CO or CO2, and with boiler feed water, prepared using known processes. Its effluent is composed of steam, Methane, Hydrogen, Carbon Monoxide and/or Carbon Dioxide. The reactor is hung from the casing of a vertical well containing appropriate oil well tubings to bring from the surface the various reactor feed streams and to carry to the surface the fluids produced from the heavy oil reservoir. The reactor discharges its effluent into one or several horizontal wells or drainholes drilled into the oil reservoir and capable of being operated in the cyclic or "huff and puff" mode of steam injection.

Downhole steam generators present the advantage of eliminating the degradation of steam quality resulting from heat losses through surface lines and through the tubings leading from the surface to the oil zone. Such heat losses become excessive in deep wells and prevent the economic application of steam injection techniques to the recovery of heavy oil from deep reservoirs and from those under a great depth of water or below a thick Permafrost layer.

Combustion-type downhole steam generators which have been tested result in very low heat rates, less than 7 MMBTU/h, and deliver highly corrosive products which quickly destroy the well tubular goods and the metal parts, at very high temperature, in the combustor assembly.

On the contrary, the downhole steam generator using the catalytic Methanation reaction is capable of delivering to the oil reservoir a heat rate exceeding 170 MMBTU/h; its effluent is non-corrosive and the hottest point in the reactor is at 800 F., a temperature acceptable for many available steel alloys.

Commercially available Methanation catalysts, capable of high conversion efficiency and long life at that temperature are used in the present downhole reactor.

The reactor effluent may be discharged successively into each of several horizontal drainholes connected to the same vertical cased well, of larger diameter. This provides for "huff and puff" operation of each drainhole, in succession, while maintaining a steady oil production from those drainholes not currently receiving the effluent from the downhole reactor.

The hot production stream flowing from these drainholes to the surface exchanges some of its heat with the Syngas and boiler feed water streams flowing downhole. This increases the reactor heat rate while preventing this heat from being transferred to the formations surrounding the vertical well. This is a very desirable feature when the surrounding formations include a thick Permafrost zone.

BACKGROUND AND SUMMARY OF THE INVENTION

Recovery of heavy oil by steam injection from the surface is a well known process. Its application is, however, limited to relatively shallow wells, of less than 2,500 ft in most cases. This is because unavoidable heat losses along the flow path of steam from the boiler to the oil zone are too large and too costly. Various insulated tubings have been developed to reduce this heat loss, but their low effectiveness at the threaded joints and their high cost have limited the benefits obtainable from this approach.

Generating steam downhole is a more promising avenue, but downhole combustors, which burn a liquid or gaseous fuel in an oxygen-rich gas stream have proven disappointing. Such systems constitute a single burner furnace of small dimensions, which limits the heat rate obtainable. This is because the limited well diameter and the need for some refractory insulation to protect the metal parts of the combustor and well casing from the very hot oxidizing flame preclude the high throughput required for the production of very high heat rates.

Conventional surface facilities for the sustained production of high heat rates over long periods usually require a multiplicity of large-size burners, within a large refractory-insulated radiating chamber. Such an approach is not applicable to a downhole combustor.

Another major handicap has been the excessive rate of metal corrosion by the hot combustion products in the presence of wet steam at high pressure.

The present downhole catalytic reactor eliminates both problems, thus providing the means to economically produce heavy oil from deep reservoirs, using the basic process of U.S. Pat. No. 4,706,751.

The catalytic reactor and steam generator includes a commercially available, high temperature resistant, Methanation catalyst arranged in a fixed bed of large volume. The length occupied by such a reactor within a cased well may reach several hundred feet. The reactor is made up of several sections assembled together. The length of each section is limited by the height of the derrick in the heavy drilling rig used to handle the reactor elements after drilling and completing the drainholes and the cased well in which the reactor is hung.

Syngas flow through the bed may be vertical, upward or downward, or radial (inward or outward). Syngas crossing the fixed bed in each section reacts within the internal pores of the catalyst particles, which constitute the hottest point in the system. The catalyst particles transfer their heat to water through metallic tubular walls of sufficient surface area. The transferred heat raises the temperature of the boiler feed water to its boiling point, at the reactor pressure and vaporizes a portion of the circulating water. The low-quality steam/water mixture produced is separated in steam separators. The wet steam exiting from the separators is then flashed into the Methane-rich hot gaseous effluent from the catalytic bed, to form the mixture of high-quality steam and hot gases which is injected into the oil zone by means of horizontal drainholes. The hot water from the steam separators is mixed with the cooler water stream fed to the reactor and is recycled for another pass against the metal tube walls heated by the catalytic bed.

With water-compatible Methanation catalysts, cooling of the catalyst particles combined with steam generation may also be accomplished by direct mixing of the flowing gas phase within the bed with water vaporized from porous ceramic or glass plates (or tubes) immersed within the bed and supplied with boiler feed water. Capillary pressure within the porous ceramic provides a driving force for water flow out of the ceramic into the flowing gas phase. This is similar to the supply of liquid fuel from a wick to a flame. A suitable ceramic for this purpose is the Membralox (R) ceramic microfiltration elements manufactured by Alcoa (Separations Technology Division) for filtration applications. The present invention is, however, not limited to the use of this specific commercial product.

In a first embodiment, analogous to a water tubes boiler, the water is heated in bundles of small-diameter tubes, made of high temperature steel alloys, while the catalyst is located in the space surrounding each of the tubes. This is the preferred embodiment.

In another embodiment, analogous to a pool-boiling reactor, the catalyst is placed within a plurality of vertical steel tubes surrounded by the boiling water.

In all cases where the reactor is contained within a large-diameter cased well, the catalyst particles, metal tubes and water are contained within a cylindrical reactor shell, also made of high temperature allow steel and of diameter smaller than that of the cased well. The reactor shell is hung into the vertical casing by means of a gas-tight connection.

In another embodiment, the large-diameter vertical casing does not extend all the way to the surface. It is replaced by a thin-gauge metal lining cemented into a cylindrical cavity under-reamed below a vertical cased well of smaller diameter, providing access from the surface to the reactor in the lined cavity. In that case, no reactor shell is required.

When this embodiment is combined with the water tubes boiler-type concept, the complete bundle of water tubes is divided into a plurality of smaller elements of dimensions small enough for their insertion into the lined cavity through the access well.

Conversely, when the embodiment including a lined cavity is combined with the pool-boiling reactor concept, the bundle of catalyst-filled tubes is also divided into smaller elements to allow their insertion into the lined cavity through the smaller-diameter access well.

In the previous two last cases, the feeder tubings supplying all the individual bundle elements conveying either water, in the first instance, or Syngas, in the second instance, extend to the bottom of the central part of the lined cavity, below the access well. They are connected to each of the bundle elements by means of radial tubular arms, articulated or deformable. In the case of steel water tubes, the outlet of each bundle element is similarly connected by a radial tubular arm conveying the mixture of steam and water from the tubes to the axially located steam separators.

The horizontal drainholes may be connected either to the top of the reactor, or to its bottom. In the first alternative, the connection of each drainhole tubular liner with the vertical casing is by means of a window or penetration into said casing. In the second alternative, the connection of each drainhole tubular liner with the vertical casing or with the cavity liner is by means of a conventional multiple tubing packer.

In all cases, a valve section, located in close proximity of the drainholes entrances, provides the means for successively switching each drainhole from the production mode to the injection mode, by interrupting its flow path to the production tubing and by connecting it to the reactor outlet. The valves are controlled from the surface by hydraulic pressure or electrical means which are familiar to those skilled in the art.

Start-up of the Methanator, in all cases where temperature of the Syngas feed is below 450 F. is accomplished by the following sequence of operations:

1) The gas phase in the catalytic bed is displaced by a mixture of Hydrogen and Carbon Dioxide, with a H2/CO2 ratio greater than 4/1. This mixture, at the outlet of the compressor is at a temperature of about 300 F. Consequently, the flow of this hot gas mixture through the bed progressively raises the temperature of the catalyst particles. When that temperature reaches 200 F., CO2 in the presence of a very large excess of H2 begins to react, forming CH4 and H2O. This exothermic reaction further increases the bed temperature. Control of the rate of temperature increase is achieved by adjusting the composition of the reactor feed, without any water circulation in the tubes.

2) When the bed temperature reaches 450 F., Carbon Monoxide (CO) is gradually substituted to CO2 in the reactor feed, starting with a H2/CO ratio of about 5/1. As the temperature rises, the feed composition is slowly adjusted to reach the desired H2/CO ratio of about 3.5/1.

3) When the bed temperature reaches 600 F., water flow is started, while the Syngas feed rate is gradually increased. Both flow rates are adjusted to maintain the bed temperature below the design value for the depth of the heavy oil reservoir under consideration. A typical design temperature is about 800 F. for a depth of 3,500 ft.

In another embodiment, the Syngas feed is produced in a Downhole Partial Oxidation reactor, located above the Downhole Methanator, within a large-diameter vertical cased well. The hot effluent from the Partial Oxidation reactor is quenched by heat exchange with water-filled tubes, or by direct mixing with water. This provides for transfer of the heat of the partial oxidation of Natural Gas to the water stream while cooling the Syngas product stream to the desired temperature level for the Methanation reaction, prior to its entry into the Downhole Methanator catalytic bed. A catalyst suitable for "Direct Methanation" compatible with a Syngas feed containing both CO2 and CO as well as H2 may be used in the Methanator part of the assembly. Such catalysts have been developed by the Institute of Gas Technology (GRI-C-600 and GRI-300 series). The present invention is, however, not limited to using these specific Methanation catalysts.

The Partial Oxidation reactions followed by the product gas Quenching processes for producing Syngas from the high temperature, incomplete combustion of Natural Gas in an Oxygen and steam mixture are commonly used in known types of reactors within conventional surface process facilities but their application downhole and in combination with a novel Downhole Methanator is also novel. The main advantages of this new combination are:

1) the use of the heat of partial oxidation of Methane and of other gaseous hydrocarbon to generate additional steam downhole, 2) the elimination of any hazards related with the transportation by pipelines at the surface of toxic, high pressure, Carbon Monoxide contained in the Syngas. In this embodiment, the only fluids transported at the surface to the well-head are Oxygen and Natural Gas in separated pipeline systems, located at a safe distance from each other.

3) the elimination of environmentally undesirable heat losses and of atmospheric pollutants from conventional surface facilities when they are used to produce the Syngas feed for the Downhole Methanator. Heat losses from steam reformer furnaces, autocatalytic steam reforming reactors and partial oxidation reactors at the surface to the ground over which they are built are very detrimental when the soil is part of the Permafrost layer, as in the Arctic regions. Atmospheric pollutants in the flue gas of conventional steam reformer furnaces may also be excessive at some surface locations.

4) a large reduction in thickness of the refractory liner in said Downhole Partial Oxidation reactor. By integrating said reactor, Quench section and Downhole Methanator into a single shell, a hot high pressure gas stream flows past the outer surface of the refractory heat shield of the Downhole Partial Oxidation reactor and maintains it at a temperature above 600 F. Consequently, for the same heat loss from the reactor to its surroundings, the thickness of the refractory liner required is much less than that of the liner in a conventional surface Partial Oxidation reactor. This makes it possible to reduce the outside diameter of the Downhole Partial Oxidation reactor to that of the catalytic Downhole Methanator, in order to fit the whole assembly within the casing of a large-diameter well.

BRIEF DESCRIPTION OF THE DRAWINGS

FIG. 13A and 13B show longitudinal cross section of the valve section for this type of flapper-type retrievable downhole two-way valves. The two positions of the flapper and corresponding flow paths are shown on FIG. 13a and 13b.

FIGS. 13C and 13D show cross-sections AA and BB of FIGS. 13A and 13B.

The present invention is not limited to the use of these two types of valves nor to the use of two-way valves only. Those skilled in the art will recognize that other known types of valves, such as sliding valves, not shown, can also be adapted to this type of multi-way flow control service in a novel concept.

DESCRIPTION OF THE DOWNHOLE CHEMICAL PROCESSES

Under continuous operation, the Downhole Methanators shown on FIG. 1 to 9 receive from the surface a Syngas feed containing an excess of Hydrogen. A typical composition is 3.5 H2, 1 CO. In the presence of commercially available Methanation catalyst, in which the active agent may be Nickel, Ruthenium, Cobalt, Iron, alone or in combination on a support presenting a large surface area, the main reaction is:

$$3\ H_2 + CO = CH_4 + H_2O\ (\Delta Hx = -49.2\ Kcal/g.mole)\ \ldots \tag{1}$$

In the presence of an excess of Hydrogen, the reaction is nearly complete at temperatures above 550 F. Consequently, the effluent of the Downhole Methanator consists of a mixture of steam, CH4, H2 and CO, in decreasing order of concentrations in the mixture. During start-up, when the temperature of the catalytic bed is below 55° F., the Syngas feed supplied from the surface to the Downhole Methanator is a mixture of H2 and CO2, in the proportion of more than 4 volumes of H2 per volume of CO2. In the presence of the same catalysts, the reaction, with a large excess of H2, may be initiated at temperatures as low as 200 F., readily obtained during compression of the feed gas mixture. That reaction is:

$$4\ H_2 + CO_2 = CH_4 + 2\ H_2O\ (\Delta Hx = -39.4\ Kcal/g.mole\ CO_2)\ \ldots \tag{2}$$

With little or no cooling by water, the catalyst temperature rapidly increases to the level where reaction (1) may be initiated, by changing the Syngas feed composition accordingly.

Figure 10:
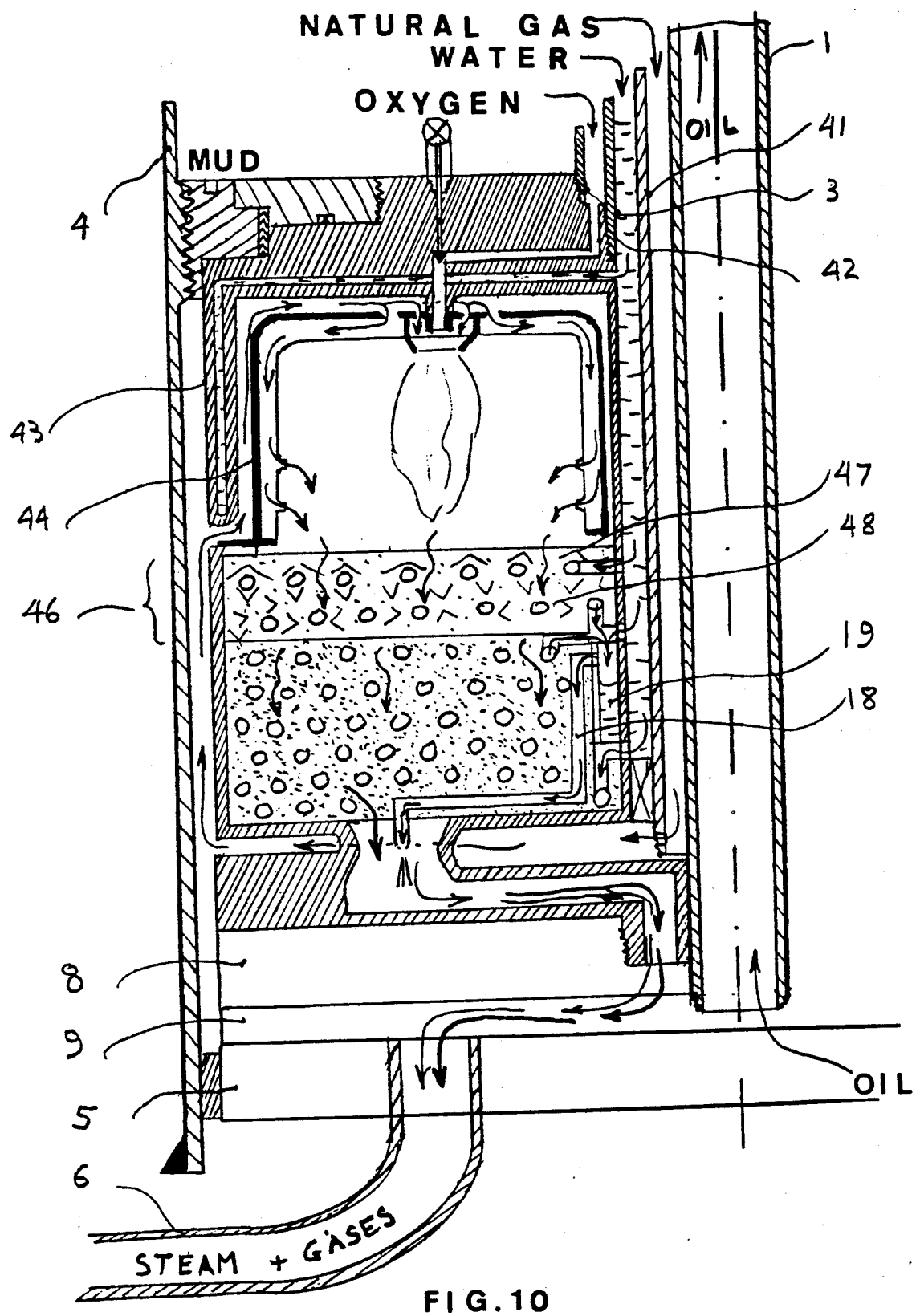
FIG. 10 is the left part of the vertical cross section of a Downhole Methanator of the type shown in FIG. 4 integrated with a Downhole Partial Oxidation reactor and a Quench section and a valve section, all contained within the same shell hung in the casing of a large-diameter well. This figure also shows the configuration of the various concentric tubings connecting the assembly to the surface. It will become apparent to those skilled in the art that other combinations of the main features of the cases illustrated by these figures may also be used without departing from the spirit and scope of the present invention.

For the Downhole reactor of FIG. 10, the reactions taking place in the Downhole Partial Oxidation reactor part of the assembly are:

$$2\ CH_4 + O_2 = 2\ CO + 4\ H_2\ (\Delta Hx = -7.6\ Kcal/g.mole\ CO)\ \ldots \tag{3}$$

$$CH_4 + O_2 = CO + H_2O + H_2 \ldots \tag{3'}$$

$$CH_4 + 2O_2 = CO_2 + 2\ H_2O\ (complete\ combustion) \ldots \tag{3''}$$

$$CH_4 = C + 2H_2\ (endothermic) \ldots \tag{4}$$

$$C + H_2O = H_2 + CO\ (endothermic) \ldots \tag{5}$$

Combined, these reactions may also give:
$$2CH_4 + 2O_2 = 3\ H_2 + CO + CO_2 + H_2O \ldots \tag{6}$$
or:
$$3CH_4 + 2\ O_2 = 6\ H_2 + 2\ CO + CO_2 \ldots \tag{6'}$$
or:
$$4CH_4 + 2O_2 = 8H_2 + 2CO + CO_2 + C \ldots \tag{6''}$$

In reality, the relative proportions of the various products, including Carbon, in the form of coke, depend upon the relative concentrations of CH4, O2 and H2O in the reactor feed and on the reactor pressure and temperature conditions.

In the case of FIG. 10, the Methanation catalyst in the Downhole Methanator part of the assembly may be a so-called "direct Methanation" catalyst, capable of catalysing not only reactions (1) and (2) but also the water gas shift reaction:

$$CO + H_2O = CO_2 + H_2\ and\ its\ reverse \ldots \tag{7}$$

These may lead to the "direct Methanation" reaction:

$$2CO + 2H_2 = CH_4 + CO_2 (\Delta Hx = -30.5\ Kcal/g.mole\ CO) \ldots \tag{8}$$

In reality, with these types of known catalysts, the over-all Methanation reaction is a combination of reactions (1), (2), (7) and (8).

Depending upon the operating conditions of both the Downhole Partial Oxidation reactor and the Downhole Methanator, the effluent of the Methanator may contain different proportions of H2, CO2, CO in addition to CH4 and steam. The net exothermic heat obtained varies accordingly, depending upon the ratio of O2/CH4 in the feed and on the amount of coke production tolerated in the Partial Oxidation reactor.

It is apparent from equations (3) and (8) that if the operating conditions are such that these are the principal reactions, most of the total heat rate is generated by reaction (8) in the catalytic bed of the Methanator, at a temperature level below 800 F. The heat rate generated in the Partial Oxidation reactor at very high temperature is less than 20% of the total heat rate generated in the downhole assembly. Furthermore, this heat rate is divided among a plurality of burners, as will be shown on FIG. 10. These are very significant improvements over the known combustor-type downhole steam generators, which allow to generate much higher steam rates downhole. Conversely, the total volume of the assembly shown on FIG. 10 is much larger than that of those known generators.

DETAILED DESCRIPTION

In all cases, the fixed catalytic beds have the shape of an annular cylinder of small cross section, typically 2.5 sq. ft., and great length (the length is limited only by the height of the derrick of the oilwell drilling rig used for assembling the various elements of the Downhole Methanator and for installing it within the well casing). Typically, the height of each bed section may be about 50 ft. The corresponding total catalyst volume in the four-section Downhole Methanators of FIG. 3 to 6 is about 370 cubic feet. In FIG. 1 to 9, three concentric tubings connect the Downhole Methanator to the surface. They are used respectively to transport the following streams: in the central tubing (1), the produced reservoir fluids in upward flow;

in the intermediate annular space between the Syngas tubing (2) and the central production tubing (1), the Syngas feed in downward flow;

in the outer annular tubing space between the water tubing (3) and the Syngas tubing (2), the boiler feed water in downward flow. The annular space between the casing (4) and the water tubing (3) is filled with stagnant thixotropic mud.

Figure 1:
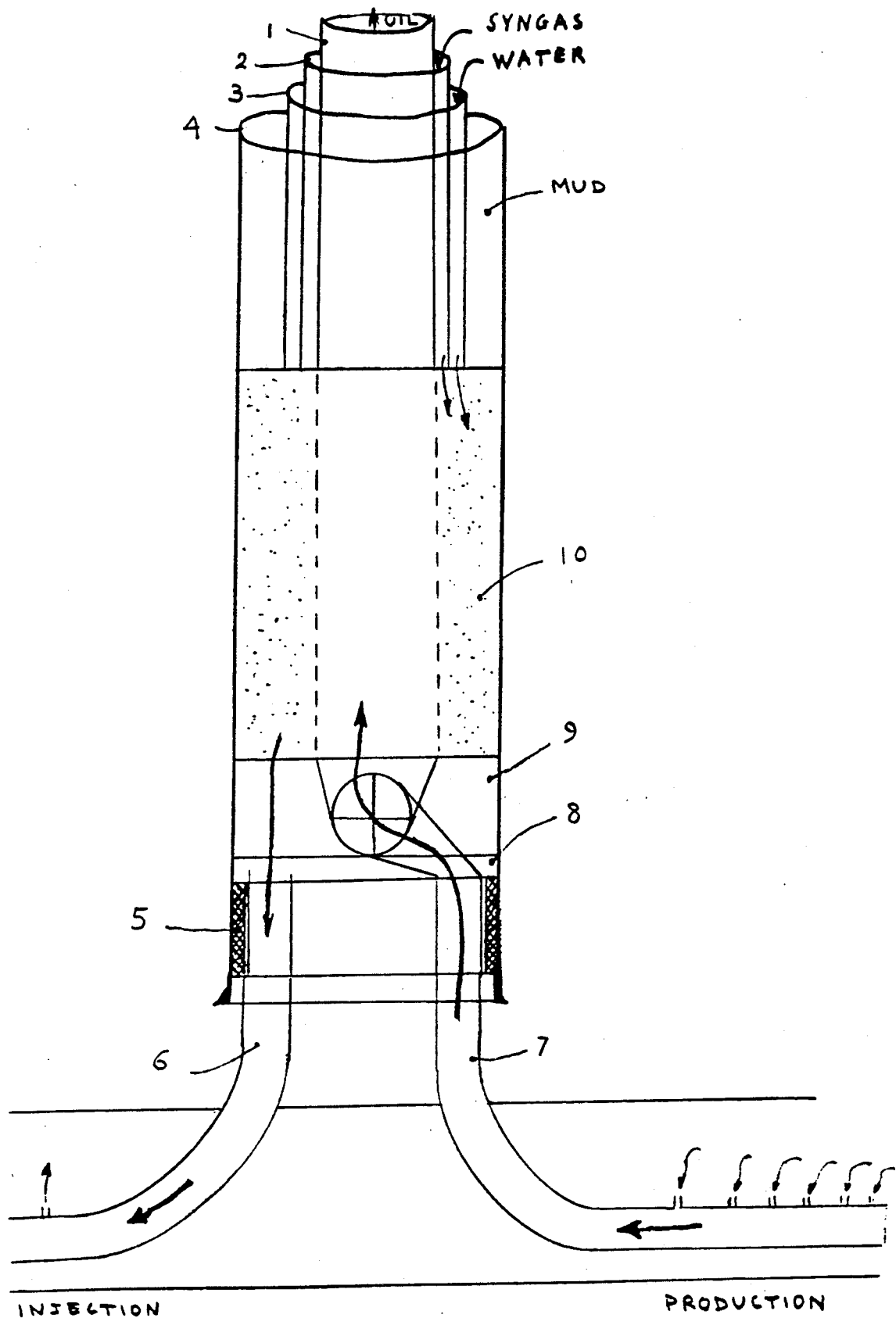
FIG. 1 is the vertical cross section of a Downhole Methanator with its catalyst in a fixed bed, within a large-diameter cased well, showing schematically its connection to the tubings supplying respectively the Syngas feed and the boiler feed water streams from the surface and its connection, through a valve section, to one of a plurality of horizontal drainholes below, while another drainhole conveys produced oil, gas and water into a central production tubing leading to the surface.

In FIG. 1, a conventional dual tubing packer (5) is used to connect the liners of two horizontal drainholes (6) and (7) to the well casing. A connector (8), fastened to the top of each drainhole liner and to the valve section (9) above it, provides leak-proof connections. Only two horizontal drainholes are shown on FIG. 1 to 10, because this is the minimum number required for "huff and puff" operation of each of the drainholes in succession. It will be apparent to those skilled in the art that more than two drainholes can be used for this purpose In that case the dual-tubing packer is replaced by a conventional multiple-tubing packer and several of the drainholes may be connected in parallel flow, either in the injection mode or in the production mode. Some of the drainholes may also be shut-in for a steam-soak period after injection. The downhole valve section is, of course, adapted to the number of drainholes to be controlled and to the desired sequence of operations.

Figure 2:
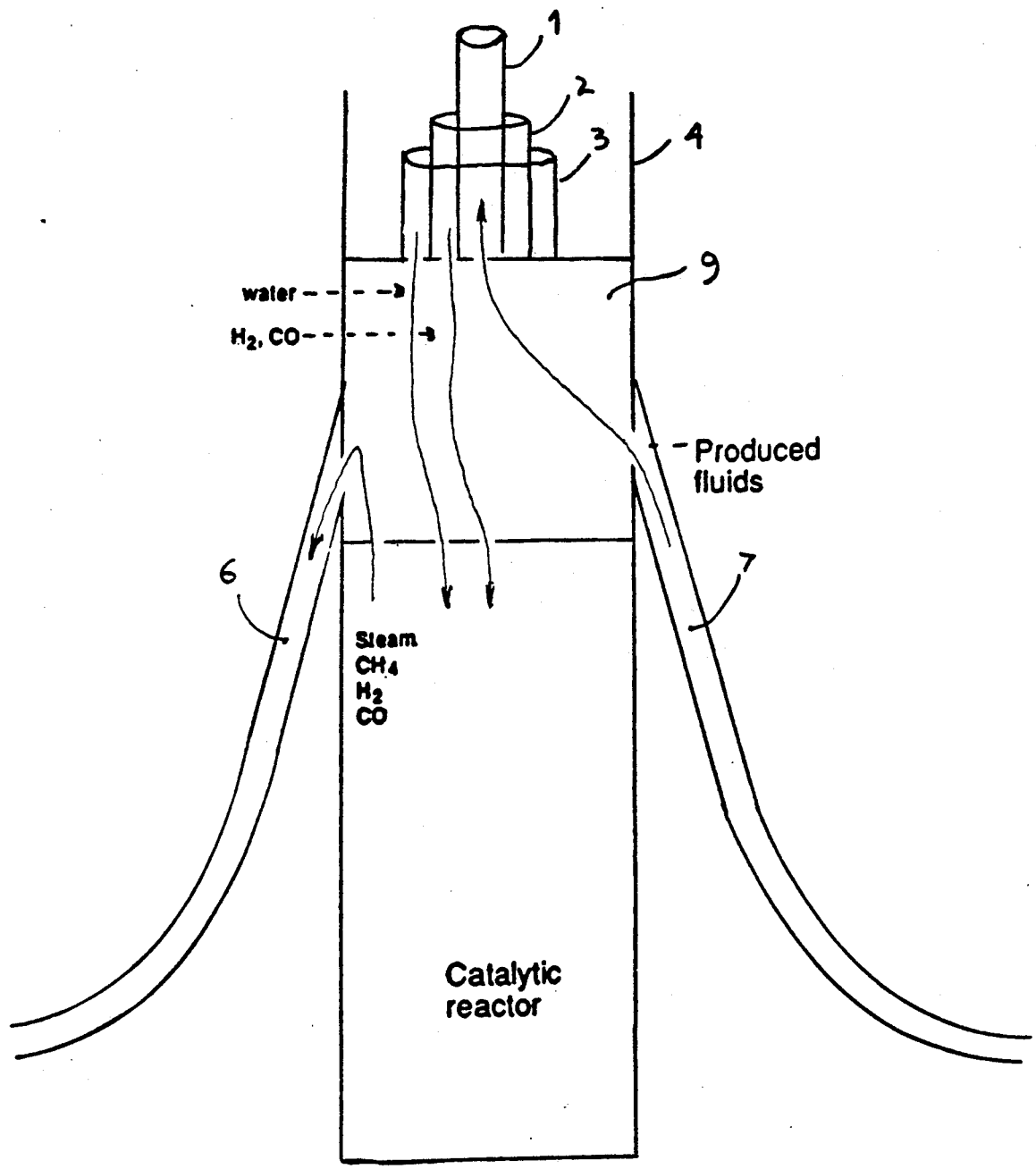
FIG. 2 is the vertical cross section of a Downhole Methanator, with its catalyst in a fixed bed, within a large-diameter cased well, showing its connection to concentric tubings supplying respectively the Syngas feed and the boiler feed water streams from the surface and its connection, through a valve section, to one of a plurality of horizontal drainholes above, while another drainhole conveys produced oil, gas and water into a central production tubing leading to the surface.

In FIG. 1, the flow of gases through the catalytic bed (10) is vertical downward. In FIG. 2, it is vertical upward. It will again be apparent to those skilled in the art that either option may be used in conjunction with any of the vertical flow catalytic beds, such as shown on FIG. 3 and 4, without departing from the spirit and scope of the present invention.

In FIG. 2, the connection between the well casing and each of the drainhole liners is through windows cut into the casing, by conventional techniques, or by means of telescopic penetrations which are run-in together with the casing (4) in the retracted position and hydraulically extended into a reamed cavity, prior to displacement of the cement slurry behind the casing. These penetrations can then be unplugged or drilled-through to start the drilling of each horizontal drainhole, using known oil field practices.

Figure 3:
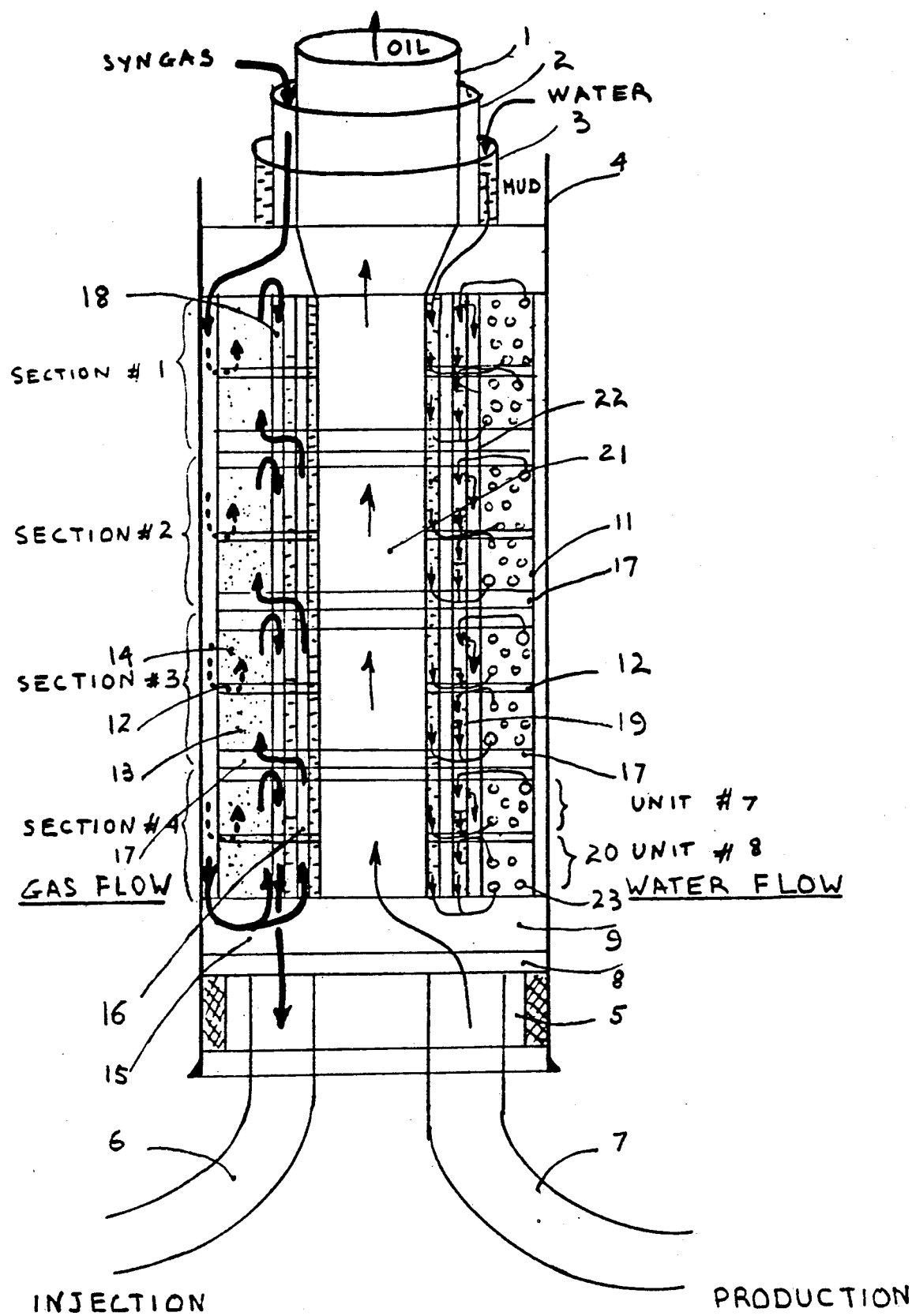
FIG. 3 is a vertical cross section of a Downhole Methanator of the type shown on FIG. 1, showing the respective flow paths of the Syngas feed and products of the Methanation reaction through four catalytic bed sections connected in parallel and the respective flow paths of boiler feed water and steam through water tubes and steam separators in eight unit bundles connected in parallel. Gas flow through the catalytic beds is vertical.

In FIG. 3, the Syngas feed is directed to the annular space between the casing (4) and the reactor shell (11). Most of this stream re-enters the reactor through the bottom. Small portions of this stream penetrates through the connector pieces (12) terminating each water tubes bundle unit. These streams, marked by dotted arrows are used to reduce the temperature of the effluent from the preceding half of the bed section (13), before it enters the second half of the section (14). The Syngas feed, pre-heated by heat exchange with the hot reactor shell penetrates in part into the base (15) of the bottom bed section and, primarily, into the Syngas collector space (16). This is an annular space connected to the base of each of the other bed sections through the basal connecting pieces (17) used to assemble together the various sections. The products from the Methanation reaction leaving from the top of each bed section enter the injectant collector space (18). This is an annular space, concentric with the Syngas collector space (16) and separated from it by the water/steam separators (19) associated with each tube bundle unit (20). The central tubing extends into the central part of the Methanator and connects to the valve section (9). This space is occupied by reservoir fluids flowing from those of the drainholes which are currently on production. The annular space (22) adjacent to this central tubing extension (21) is used to convey the boiler feed water to the base of each tube bundle unit. This water stream is mixed with that from each of the water/steam separators (19) and enters the tube bundles. All tubes (23) in each bundle are of small diameter, typically ⅜ inch OD, and wound in a helix of vertical axis, within each bed section. Their length is typically of 30 to 50 ft. They are all in parallel flow and are welded into the unit connecting pieces (12).

The mixture of steam and water flowing out of the top of each tube is directed through tangential passages in the unit connecting pieces (12) and through the top connecting pieces (17) of each of the bed sections to be led into the upper part of each water/steam separator. The centrifugal force of the water/steam jet and the difference in specific gravities of steam and water contribute to the separation of steam from water. Make-up boiler feed water may also be introduced into the separator at the top, instead of the bottom as shown on FIG. 3, prior to entering the base of the tubes in the corresponding unit bundle. This may improve separation and homogenized the temperature of water entering at the bottom of each tube. The configuration of each unit bundle and associated bed sub-section is preferably the same for all units. The number of tubes required in each of eight units is typically less than 100. The volume occupied by the water tubes within the catalytic beds typically represents less than 15% of the corresponding bed volume.

The steam collected in the upper part of each water/-steam separator flows into the injectant collector space (18) and mixes with the effluent from the beds. This mixture of steam and gases is then conveyed through the downhole valve section (9) into the liner of one or several of the horizontal drainholes (6) currently under injection.

Figure 4:
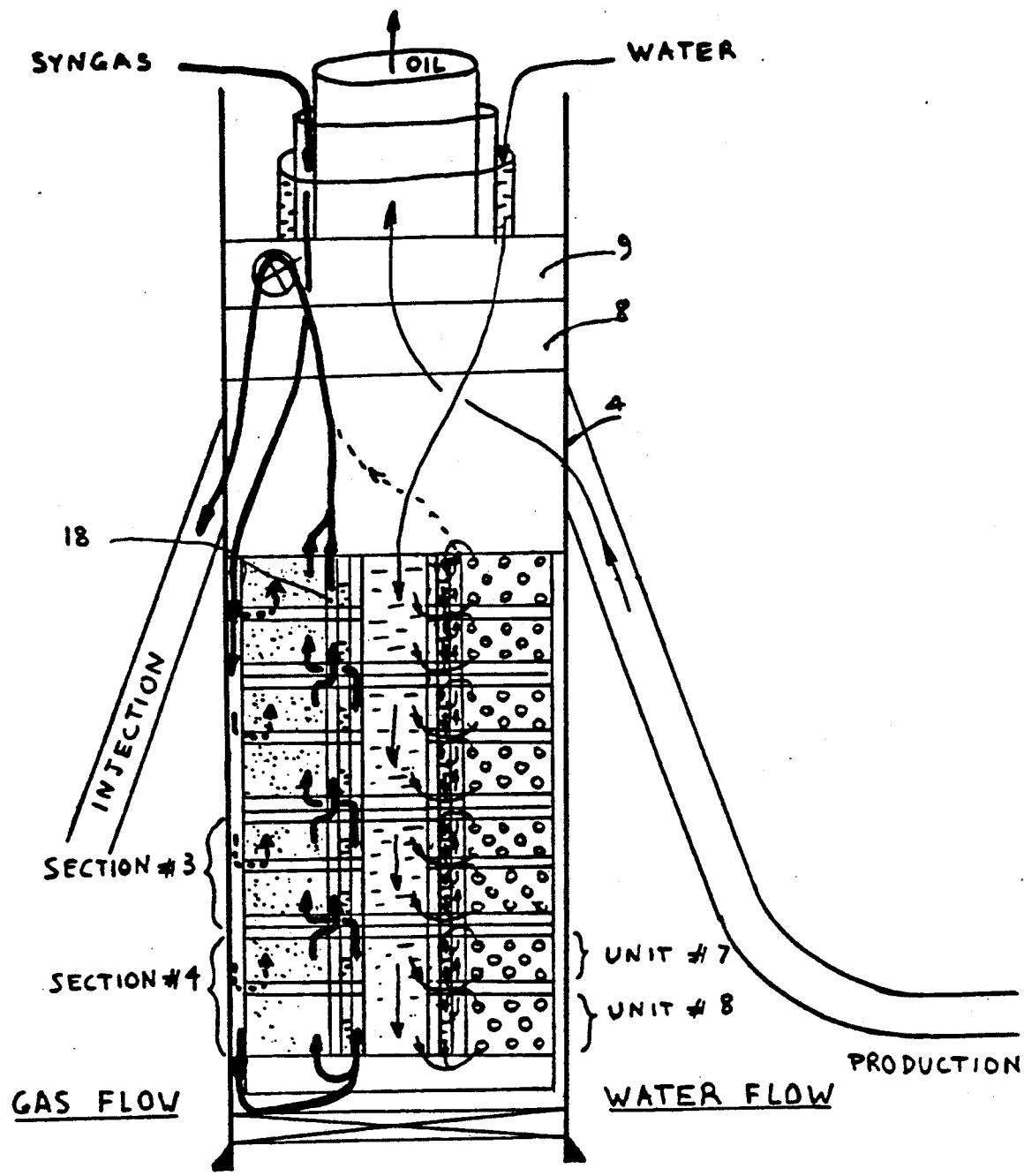
FIG. 4 is the vertical cross section of a Downhole Methanator, of the same type as that shown on FIG. 3, but showing the respective fluids flow paths for the reactor configuration of FIG. 2.

In FIG. 4, the flow of injectant in the injectant collector space (18) is upward instead of downward like in FIG. 3. Otherwise, the operation of the Downhole Methanator is the same in both of these cases, which differ primarily by the type of connection to the horizontal drainholes and by the location of the valve section (9) in the assembly.

Figure 5:
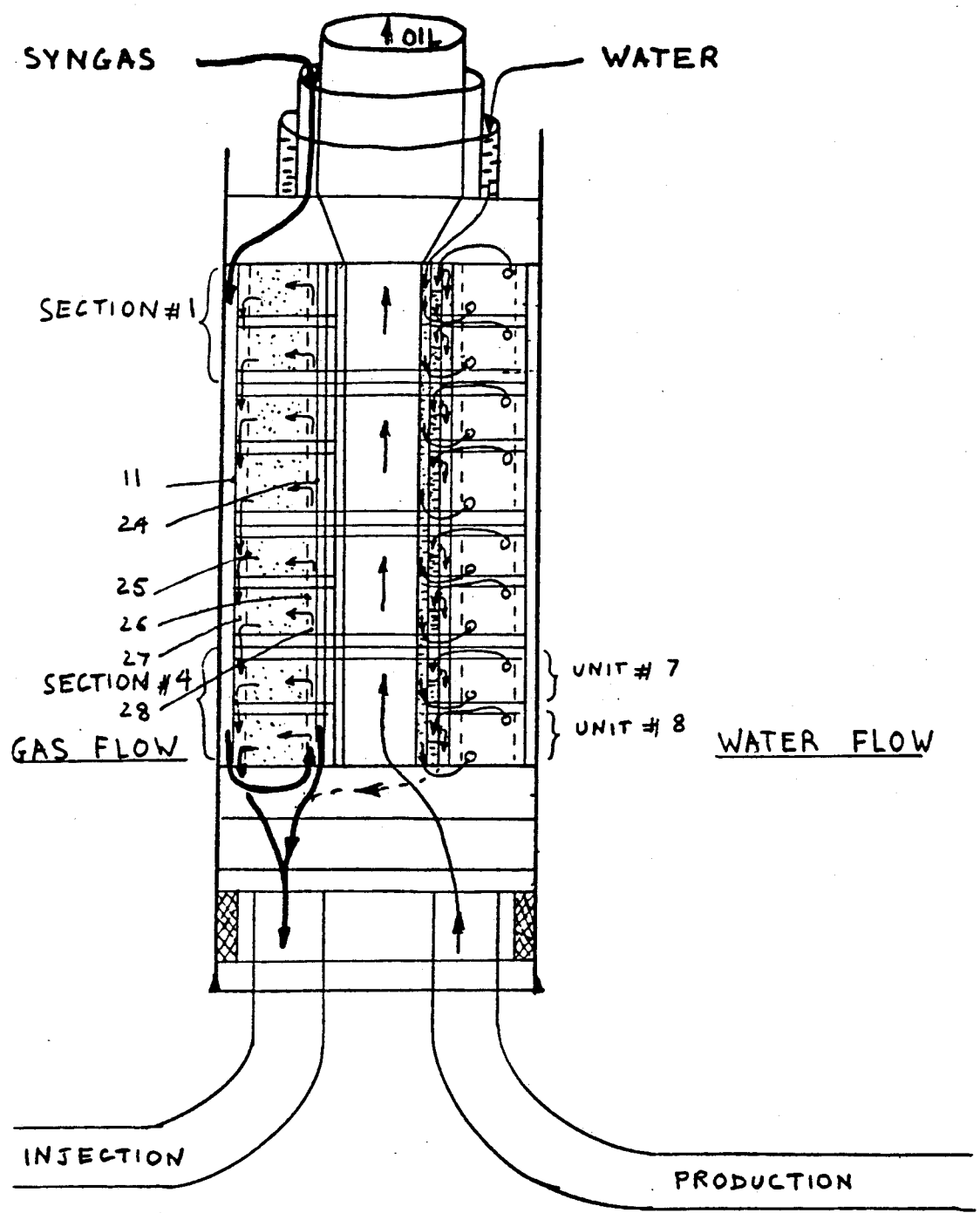
FIG. 5 is the vertical cross section of a Downhole Methanator, with the configuration of FIG. 1, but where the gas flow through the beds is radial.

FIG. 5 presents the same configuration as in FIG. 3, regarding the water and steam circulation system, the connection with the drainholes and the location of the valve section. The annular beds in FIG. 5 are, however, separated respectively from the reactor shell (11) and from the injectant tubing (24) by the outer and inner screens (25) and (26). The annular spaces adjacent to the screens are respectively used, for the outer gas space (27), to collect the effluents from the various sections and, for the inner gas space (28), to serve as Syngas collector.

Figure 6:
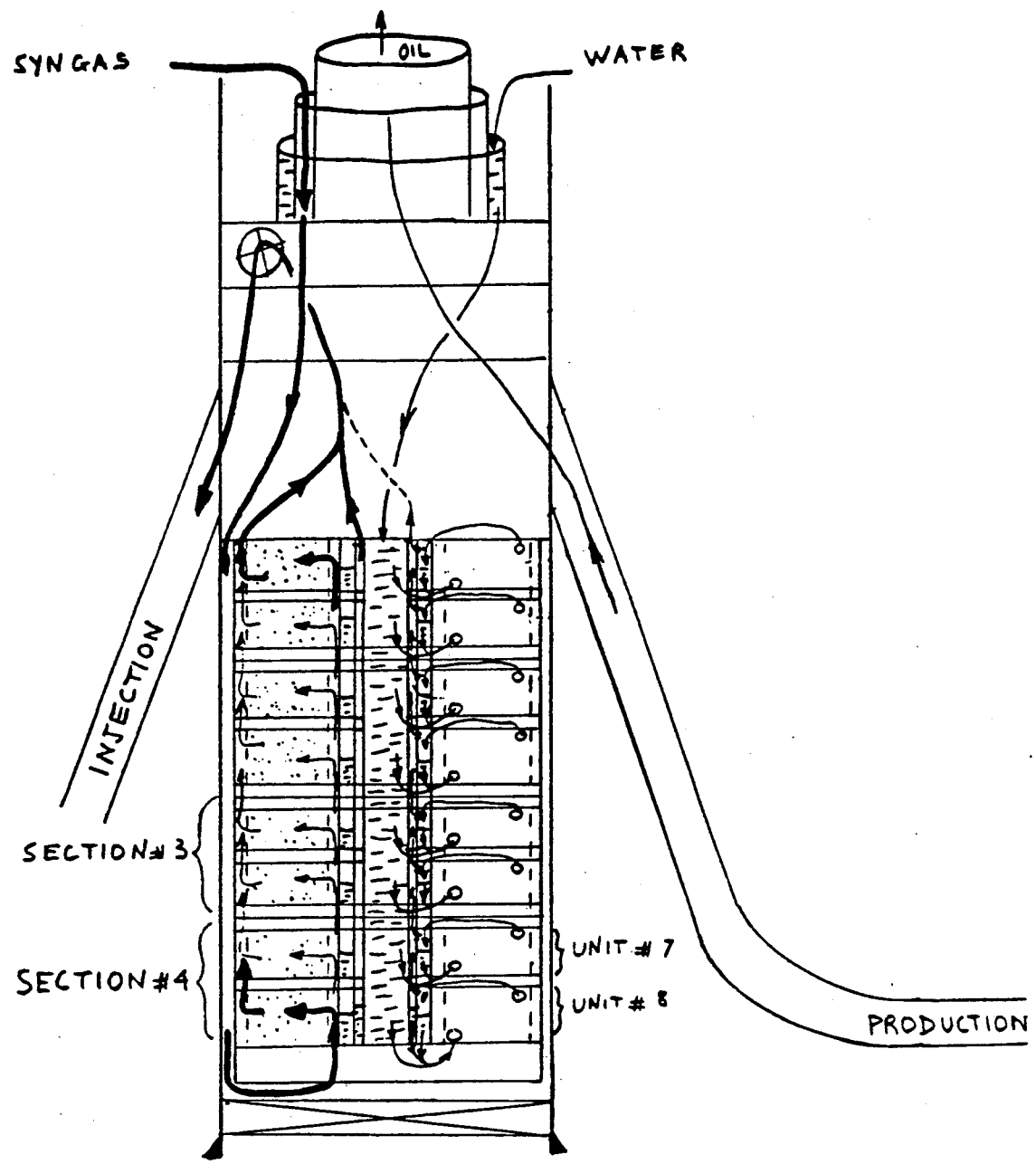
FIG. 6 is the vertical cross section of a Downhole Methanator, with the configuration of FIG. 2, but where the gas flow through the beds is radial.

FIG. 6 presents the same configuration as FIG. 4 regarding the water and steam circulation system, the connection with the drainholes and the location of the valve section. The configuration of the catalytic beds, inner and outer screens is the same as in FIG. 5, with the only difference that the injectant mixture flows upward in the outer gas space, instead of downward like in FIG. 5.

Figure 7:
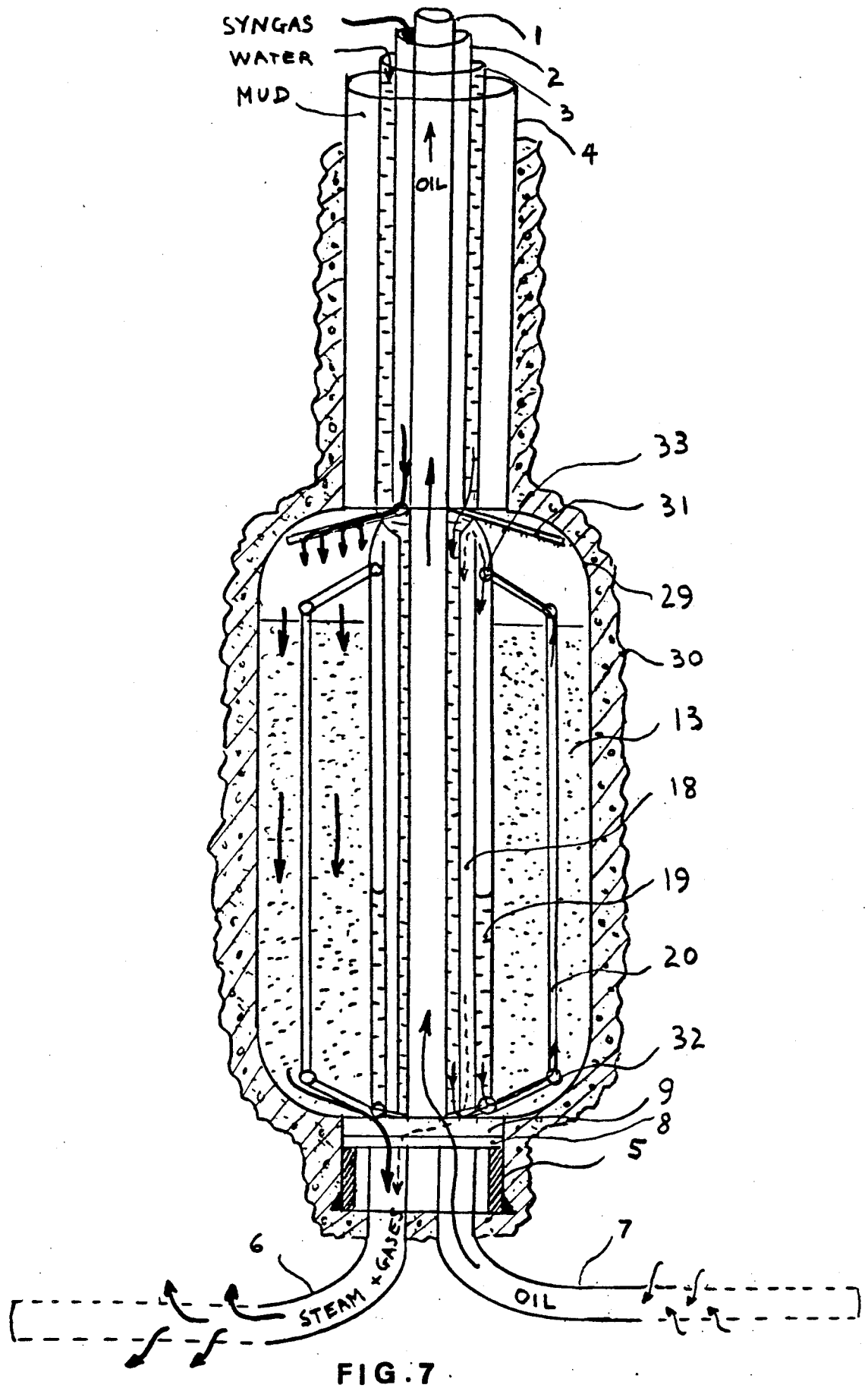
FIG. 7 is the vertical cross section of a Downhole Methanator contained within the cemented, metal-lined, cavity under-reamed below an access well of smaller diameter. The catalyst within the cavity is in a fixed bed surrounding boiler-type water tubes, as in FIG. 1. The Downhole Methanator in this case, as in FIG. 1, is also connected to one of a plurality of horizontal drainholes located below said cavity Reservoir fluids produced from another drainhole are conveyed through a valve section to a central production tubing leading to the surface. Concentric tubings, also located within the casing of the access well, transport respectively the Syngas feed and the boiler feed water from the surface to the Downhole Methanator.

FIG. 7 shows a Downhole Methanator located within the lined cavity under-reamed below a smaller-diameter access well. The casing (4) of the access well and the cavity liner (29) are both cemented into the geologic formations above the oil zone. As in FIG. 1, 3 and 5, the effluent of a single catalytic bed (13) and steam generated in the water tubes (20) are injected together into one of a plurality of horizontal drainholes (6) drilled below the Methanator. The water tubes, however, are now vertical instead of being in a helix of vertical axis. They are connected through articulations (32) at top and bottom respectively to the steam separator (19) and to the boiler feed water extension tubing (3). The Syngas feed is distributed over the entire cross section of the bed by means of articulated tube ramps (31). The purpose of all these articulations is to allow their introduction into the lined cavity in their folded position, where their over-all diameter is smaller than that of the access well casing. Once into the lined cavity, the articulations are placed in their open (and extended) position so as to place the water tubes approximately at the mid-distance between the diameter of the cavity and that of the wall of the water/steam separator. During this extension outward of the tubes into the cavity, the top articulations (33) slide down vertically on a sleeve or other mechanical means familiar to those skilled in the art. The water circulation system is similar in concept to that of a single bundle unit in FIG. 3 or 5. The steam from the separator is gathered into an annular collector space (18), prior to its injection, mixed with the bed effluent gases, into drainhole (6). In this example, the flow of gas through the catalytic bed is downward, from the injection ramps (31) located at the top of the cavity. As in FIG. 3 and 5, the reservoir fluids produced from drainhole (7) are conveyed to the surface through a tubing extending down to the valve section (9). The valve section is again connected through a leak-proof connector (8) to the entrance of the drainholes, at the top of a multiple tubing completion packer (5), of known design.

The thin-gauge metal liner is also introduced into the under-reamed cavity in its folded position, prior to the cementing of the cavity and well casing bottom. Once into the mud-filled cavity, the liner is hydraulically expanded by closing the casing fill-up valve and increasing the fluid pressure within the folded and deformable liner. The liner is kept in its inflated position by fluid pressure during the cementing of the liner and casing. This requires the temporary use of a central extension tube from the top of the liner to its bottom, to convey the cement slurry through the casing (4) and through the central extension tube to the bottom part of the casing and out into the annulus to displace the drilling mud by cement. Small metal anchors are welded to the outer skin of the liner, which, when the liner is inflated and completely unfolded, become imbedded into the displaced cement slurry. After the cement has set and when its strength is sufficient to hold the overburden pressure, the fluid pressure within the liner is reduced and the lined and cemented cavity is filled with pure water, in preparation to the installation of the internals of the Downhole Methanator, as previously described. Those familiar with oil well completion operations will recognize the various steps required to achieve this purpose. After installation and leak-testing of all internals into the water-filled, lined and cemented cavity, water is displaced by dry inert gas under pressure which is circulated back to the surface through one of the tubings in the access well. The catalyst particles introduced into this flowing gas stream are entrained downhole and settle into the lined cavity until it is nearly filled. The Methanator is then complete and ready for start-up, using the procedure previously described.

Figure 8:
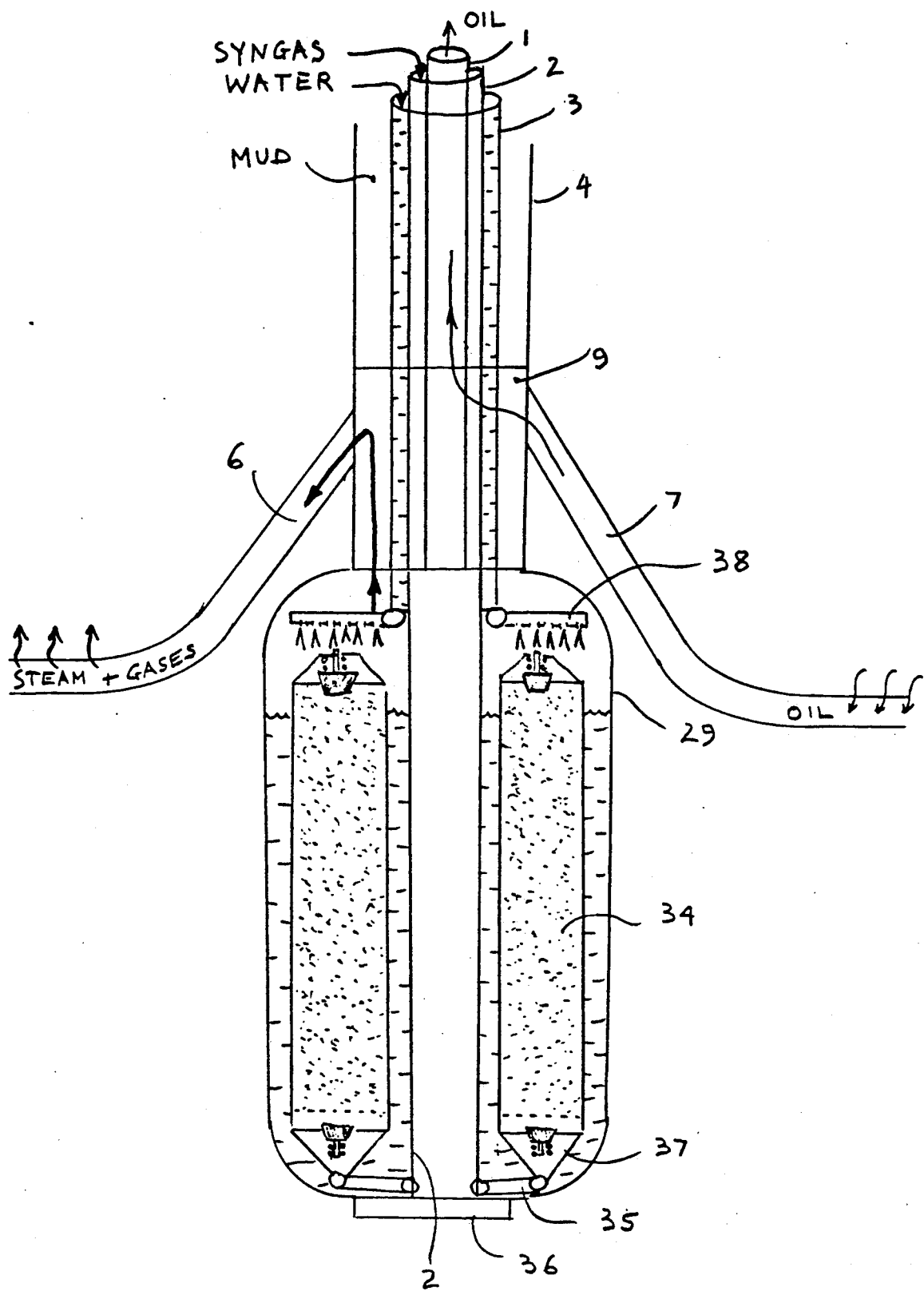
FIG. 8 is the vertical cross section of a Downhole Methanator of the type of FIG. 7, in which the Methanator connection to the horizontal drainholes is located at the base of the access well, above the Methanator, as in FIG. 2. The fixed catalytic beds in this case are enclosed within vertical tubes immersed in the boiling water filling the lined cavity.

FIG. 8 shows a Downhole Methanator located within a lined and cemented cavity under-reamed below a smaller-diameter access well, like in FIG. 7. In this case, however, the connection to the horizontal drainhole is at the top of the Methanator, like in FIG. 2, 4 and 6. A significant difference is the bed water cooling system. In the present case, the catalytic bed is contained within a bundle of vertical tubes (34) of diameter small enough to go through the access well casing, one at a time. The catalyst-filled tubes are connected at their base to a set of radially extended articulated distributor tubes (35), connected to an extension of the Syngas tubing (2). The distributor tubes are inserted into the lined cavity in their folded position, where their over-all diameter is less than that of the casing (4). Once inside the cavity, they are unfolded radially like the spokes of an umbrella and connected to the center base plate (36) of the liner. The tubing used to insert them into the well and cavity is disconnected and pulled out of the well. Each catalyst-filled tube is equipped with a reversed check-valve at the base and with a check-valve at the top. Both check-valves are closed and pre-set to open at a pressure higher than the hydrostatic pressure of water in the well and cavity. Each tube is lowered into the well at the end of a surface-operated arm, which is raised to the horizontal once inside the lined cavity (29). The tubing is then oriented and lowered so as to position the base of the tube over a connecting piece (37) at the end of each of the extended distributor arms. When the connecting piece is mated with the base or the tube, a pressure-tight connection is achieved, by means of suitable metal/metal seals. After all catalyst-filled tubes have been installed, at the periphery of the lined cavity, an extension of the water tubing (3), consisting of a set of articulated, radially extending spray ramps (38) is lowered into the well, in the folded position, and opened when inside the upper part of the lined cavity. The extension of the Syngas tubing (2) is then installed, to connect with the center base plate (36) and radial distributor tubes (35). After installation of the valve section (9) and connection with the horizontal drainholes, water is displaced from the Syngas tubing and from the upper part of the lined cavity.

Figure 9:
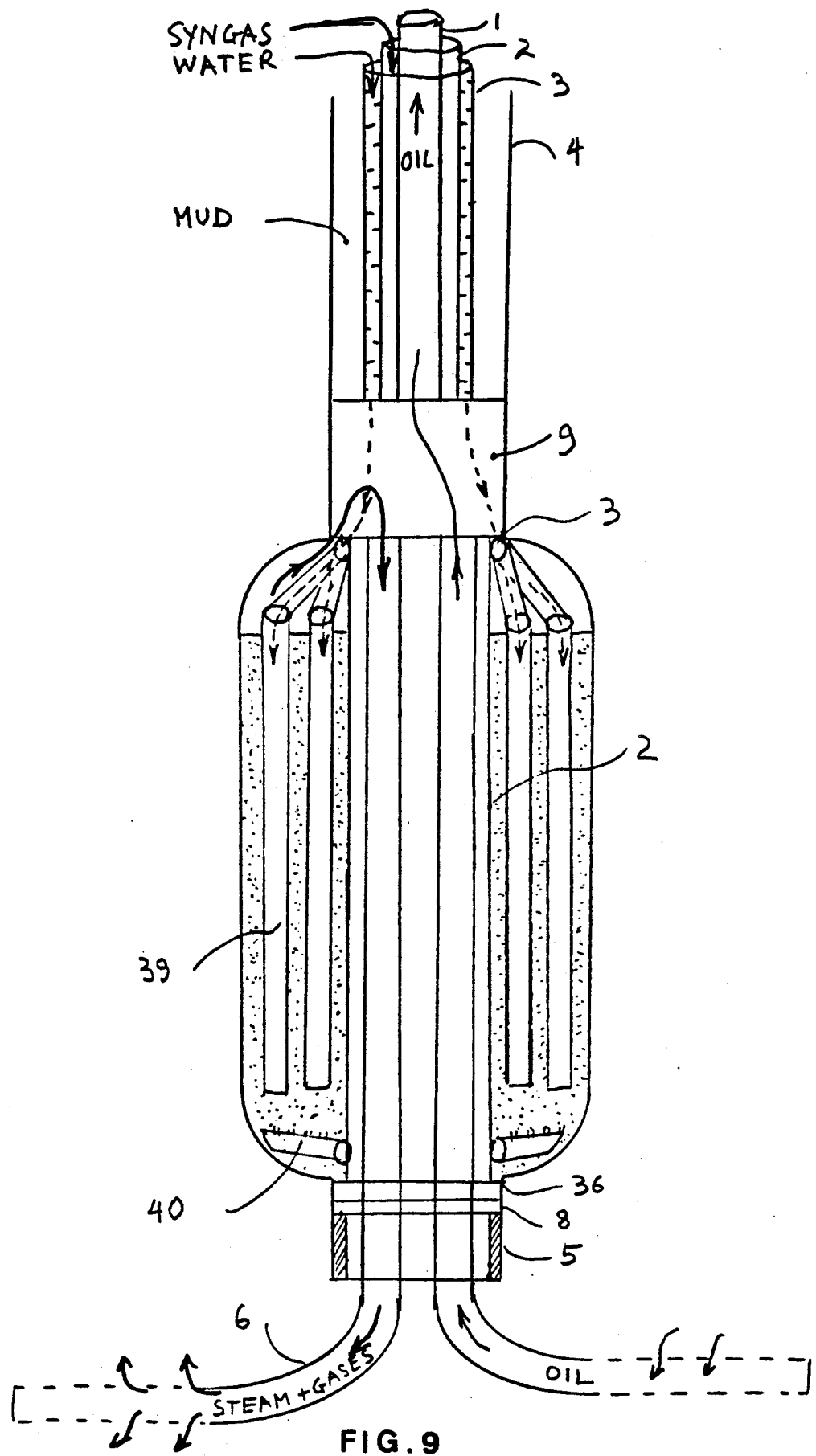
FIG. 9 is the vertical cross section of a Downhole Methanator, also contained within a lined cavity below an access well where the catalyst within the cavity is in a fixed bed cooled by direct mixing with water distributed by ceramic porous tubes immersed within the bed. In this case, the drainholes connected to the Methanator are located below the Methanator, but the valve section is located within the access well, at the bottom.

The Downhole Methanator is then ready for start-up, by injection of high pressure Syngas, which opens the check valves protecting the catalyst from water entry. The start-up sequence is the same as previously described. Under normal operations, the lined cavity, partly filled with boiling water serves as water/steam separator. The effluent from the catalyst tubes is mixed with steam in the upper part of the cavity and the resulting injectant mixture is conveyed through the valve section to the drainhole (6) currently under injection. FIG. 9 shows a Downhole Methanator located within a lined cavity, partly filled with a bed of catalyst particles, as in FIG. 7. Water-cooling of the bed, by steam generation, is achieved by direct mixing of water exsuding from the fine pores of a set of porous ceramic tubes (39) into the gas phase flowing through the bed. In the present example, the flow of gas through the bed is upward, from a set of gas distributor tubes (40) radiating from the center base plate of the liner, and connected to an extension of the Syngas tubing, similar to that of FIG. 8. The porous ceramic tubes used to distribute water throughout the bed are connected through articulated joints to a set of radially extending water distributor arms supplied by the water tubing (3). These arms and the ceramic tubes are lowered into the lined cavity in the retracted, or folded, position in the same way as the water ramps and Syngas distributor tubes of FIG. 8. To illustrate another configuration of the valve section with respect to the drainholes with which it is connected, the valve section (9) is located above the Methanator and is directly connected to the entrance of the drainholes, which extend from the multiple tubing completion packer (5) below the Methanator to the valve section (9) above the Methanator, passing through the central part of the catalytic bed. FIG. 10 shows a Downhole Methanator integrated with a Downhole Partial Oxidation reactor and Quench section within the same shell, hung into the casing of a large-diameter well. In this case again, the central tubing (1) carries the reservoir fluids to the surface, the next concentric tubing (41) brings the Natural Gas stream to feed the Downhole Partial Oxidation reactor. The next concentric tubing is the boiler feed water tubing (3). A fourth concentric tubing (42) brings the Oxygen stream from the surface to the Downhole Partial Oxidation reactor (43). The annulus between this fourth tubing and the casing is filled with stagnant mud, as in all previous cases.

The Partial Oxidation reactor part (43) of the whole assembly consists of a ceramic heat shield (44), protecting the water tubing (3) and the water-cooled top part of the shell (11) from the high heat generated by a plurality of down-firing vertical burners located radially around the Oxygen tubing (42). The Oxygen flow into each burner is controlled by a separate valve operated from the surface, located on the top of the assembly, adjacent to the threaded hanger in the large-diameter casing. Within the ceramic heat shield (44), a series of metal canisters (45) similar in concept with those of a gas turbine, surrounds each of the burners. The Natural Gas feed circulates in the annulus between the reactor shell (11) and the casing (4), flowing upward past the catalytic bed (13) of the Downhole Methanator, past the Quench section (46) and penetrates through check valves into the shell (11) at the base of the heat shield, passing first outside of it and then inside, between the heat shield and the canisters. In the course of its long flow path against hot surfaces, the Natural Gas is preheated before reaching the top burners and the secondary supply holes in the lower part of the canisters. In a variant of this basic design, the walls of the combustion chamber or canisters are not made of high temperature alloy steels, but of high thermal conductivity ceramics, such as alpha Silicon Carbide. The combustion is initiated in the burners by electrical means, like those used in a gas turbine, and the flame jet mixes with the secondary methane in the canisters which serve as combustion chambers for the Partial Oxidation reactions. The hot Syngas resulting from these reactions exits into the Quench section (46).

The Quench section consists of a fixed bed of coarse ceramic particle (47) in which water tubes (48) are immersed. These may be of the metal type (20) or of the porous ceramic type (39). In the first alternative, cooling of the quenching fixed bed is by heat exchange with the water-filled metal tubes. In the second alternative, quenching is due to the vaporization of water in the hot Syngas stream. The coarse ceramic particles in the Quench section also serve as a coke filter. Steam may be added to the Natural Gas feed of the Partial Oxidation reactor to facilitate mixing the secondary gas feed streams with the flames of the burners, while reducing the formation of coke according to reaction (5). Carbon dioxide, which may be present initially in the Natural Gas feed also modifies the composition of the reactor effluent, especially the H2/CO ratio. By adjusting the operating parameters, a small excess of Hydrogen in the Methanator feed may be obtained, which tends to drive the Methanation reactions to near completion, using commercially available catalysts. All Methanation catalysts are compatible with steam, which is one of the reaction products in equations (1), (2) and (7), but the catalysts described by Quang et al. in U.S. Pat. No.4,497,910 are also compatible with liquid water. For this reason, this type of catalyst may be used preferentially when the Methanator water cooling system is by direct mixing with water supplied from porous ceramic or glass tubes, as in FIG. 9.

The effluent from the fixed bed (46) of coarse particles in the Quench section, cooled to a temperature below 800 F., enters the fixed bed of Methanation catalyst particles (13) located below where the reactions of Methanation proceed, generating steam in the water cooling system, as in FIG. 3, 4 and 10. The water tubes may again be made of metal (as in FIG. 3 and 4) or of porous ceramic (as in FIG. 9).

Figures 11, 11A, 11B, 11C:
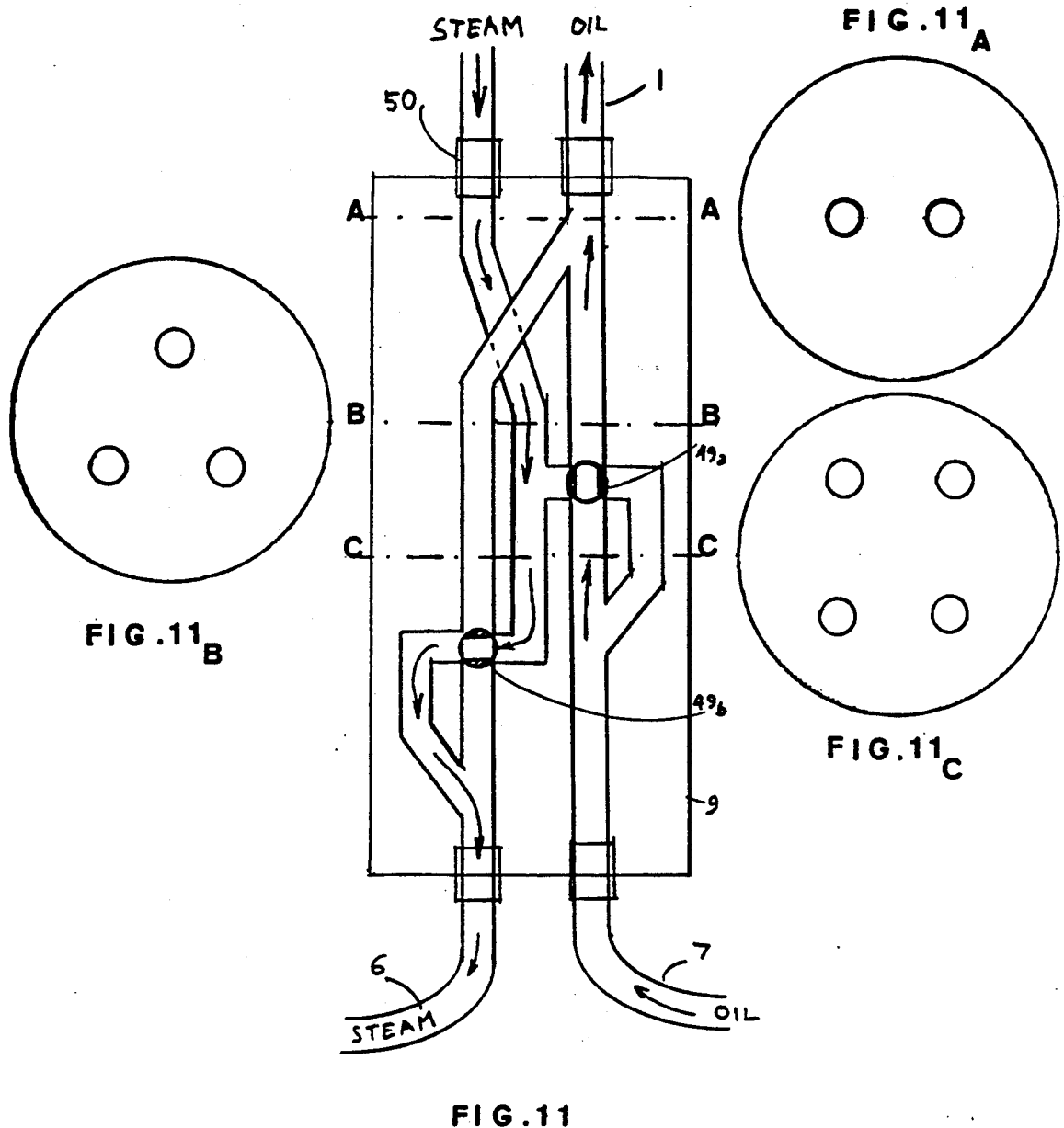
FIG. 11 is a vertical cross section of the valve section, showing the various fluids flow paths from the producing drainhole to the surface and from the Downhole Methanator to the injection drainhole. Flow control in this example is by means of a pair of two-way full opening ball valves.
FIGS. 11a to 11c show horizontal cross sections of the tubings at various level.
Figures 12A, 12B:
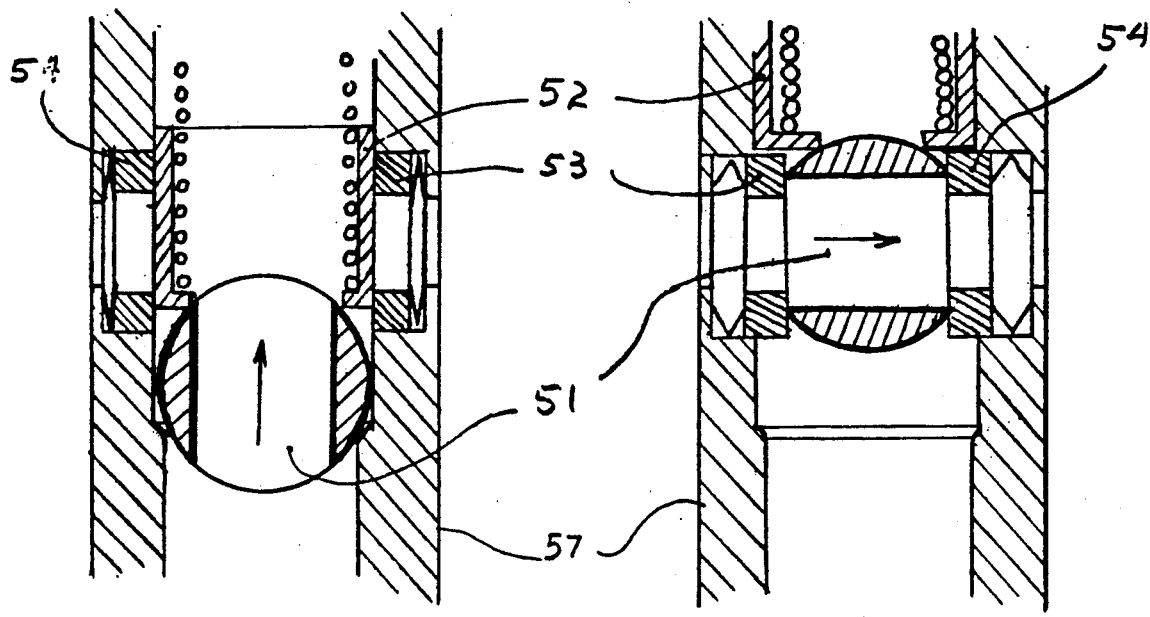
FIGS. 12A and 12B show longitudinal cross sections of a novel ball-type retrievable downhole two-way valve suitable for use in the valve section shown on FIG. 11. The two positions of the ball are shown in FIG. 12a and 12b.

The catalytic bed (13) may again be divided into several sections connected in parallel flow and the metallic water tube system may also be divided into several unit bundles discharging into several water/steam separators, as in FIG. 3 and 4. The bed configuration of FIG. 5 may also be combined with the use of ceramic tubes arranged as in FIG. 9. It will be apparent to those skilled in the art that all such combinations may be used without departing from the spirit and scope of the present invention. Finally, the steam and gases produced as a result of the processes occurring within the Partial Oxidation section, the Quench section and the Methanator sections enter as a mixture into the valve section (9), to be conveyed to one of several of the horizontal drainholes (6), while reservoir fluids produced into the other drainholes (7) are conveyed to the surface. FIG. 11 shows schematically the flow paths of the respective fluids, into or out of two drainholes (6) and (7), when using a pair of two-way downhole valves (49a) and (49b). These provide a full opening for the introduction of logging or cleaning tools into each of the drainholes, when the corresponding two-way valve is open to the production tubing (1) and closed to the tubular connection (50) bringing the injectant stream of steam and gases to the valve section. The same functions can also be obtained in another valve section from a single valve successively presenting a single movable part opposite the required number of ways or openings. It will be apparent to those skilled in the art that FIG. 11 describes only one of the simplest of many possible manifolding configurations, to illustrate the general concept of the valve section in the present invention. FIGS. 12A and 12B shows how a conventional downhole safety valve of the ball type originally designed to provide on/off service only can be modified to operate as each of the two-way valves 49a and 49b shown on FIG. 11. With the axis of the opening (51) in the ball in the vertical position and the ball rolled down, the valve provides full opening passage from the drainhole (7) to the production tubing, as shown in FIG. 12a, while the sliding flow tube (52), covering the two horizontal sealing tubes (53) and (54) fully recessed within the wall of the valve body (57), is closing the flow path in the horizontal direction. With the ball rolled-up and said opening axis in the horizontal position, as shown in FIG. 12b the flow tube (52) is in its upper position, leaving the horizontal sealing tubes (53) and (54) uncovered and extending out of their recess into the vertical cavity of the valve body. The spring-loaded horizontal sealing tubes are then pressed against the ball surface around its opening to provide a seal for flow of steam and gases in the horizontal direction, while the production tubing is shut off from its previous communication with the drainhole, by the blind ball surface pressing against the base of the flow tube. Because of the high temperature environment, metal to metal seals are preferred. This brief description illustrates the basic concept under which the same ball opening successively provides communication between the same drainhole and the steam and gases outlet, while closing the reservoir fluids flow path to the production tubing and vice versa. If two such identical ball-type valves are operated simultaneously from the surface, by known electrical or hydraulic actuators, in such a way that one of the ball openings always has its axis in the opposite position, vertical or horizontal, of the axis of the opening in the other ball, the two drainholes shown on FIG. 11 can effectively be switched from one mode of operation "huff" to the other mode of operation "puff" and vice versa.

Figures 12C, 12D:
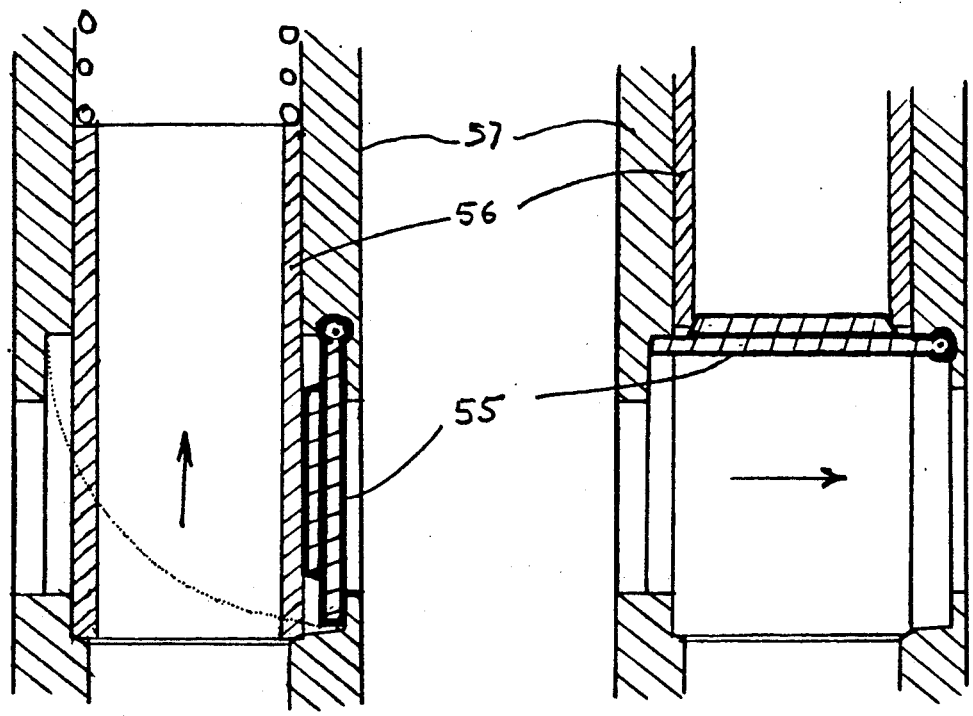
FIGS. 12c and 12d show the corresponding positions of a novel flapper-type retrievable downhole two-way valve equally suitable for use in another valve section based on the same concept.

FIG. 12c and FIG. 12d illustrate the same concept using flapper-type downhole valves, with the flapper (55) respectively in the vertical and horizontal positions and performing the dual functions of closing the horizontal flow path while the vertical flow path is open, and vice versa. This requires that the hinged flapper be designed to seal on both faces, contrary to that of a conventional downhole flapper valve, which seals only on one face. The movable flow tube (56) may be used to provide a secondary seal (57) to shut off the flow of steam and gases from the horizontal path. The means for running-in, sealing and locking in place this new type of wireline retrievable valves and tubing retrievable valves are familiar to those skilled in the art, who will also perceive that the same flow switching operations may equally be achieved with sliding mandrel valves presenting the required number of ports and openings.

FIGS. 13A and 13B show that, with the novel flapper-type two-way valves shown on FIG. 12c and 12d, it is possible to reduce to three the maximum number of tubular passages within the valve section. FIGS. 13a and 13b show the various flow paths for the respective two positions of the flapper in both valves.

I claim:

1. Apparatus for generating downhole large volumes of high quality steam and gases capable of making Heavy Oil more mobile; said apparatus comprising: (a) a Downhole catalytic Methanator reactor assembly,
   (b) means for hanging said assembly into the cemented casing of a vertical well,
   (c) a plurality of liner-equipped nearly horizontal drainholes, drilled into the oil reservoir for injecting said steam and gases into said reservoir,
   (d) means for connecting said drainholes liners to said well casing,
   (e) vertical tubings connecting said assembly to the surface,
   (f) a downhole valve section including surface-operated valves for successively directing the injectant stream from said assembly into each one of said drainholes and for simultaneously directing the flow of reservoir fluids produced from at least one of the other drainholes into a production tubing, located within said well casing,
   (g) means for transporting the required feed gases and water from the surface to said reactor and steam generator through said vertical tubings.

2. A Downhole catalytic Methanator reactor assembly according to claim 1 in which the catalyst is in a fixed bed having the shape of an elongated cylinder with an annular cross section, contained within concentric metal shells.

3. A downhole catalytic Methanator reactor assembly according to claims 1 or 2 wherein said fixed bed catalyst particles are cooled by heat exchange with boiler-type metallic water tubes located within said fixed bed and in which steam is generated from the heat of exothermic reactions taking place within said catalyst and reactor assembly.

4. Downhole catalytic Methanator reactor assembly according to claims 1 or 2 in which said fixed catalytic bed is enclosed in a plurality of vertical metal tubes immersed in a boiling water pool, where steam is generated from the transferred heat of the exothermic Methanation reactions taking place within said catalyst-filled metal tubes.

5. A Downhole catalytic Methanator reactor assembly according to claims 1 or 2 in which said fixed catalytic bed is cooled by direct flashing of water into the gases flowing through said bed, wherein said water is supplied through porous ceramic or glass tubular or flat surfaces in direct contact with said catalyst particles and flowing gases.

6. A Downhole catalytic Methanator reactor assembly according to claim 1 contained within a metal-lined and cemented cavity under-reamed below a smaller-diameter access well connecting said reactor assembly to the surface.

7. A Downhole catalytic Methanator reactor assembly according to claim 1 made up of several sections assembled together end to end and contained within a pressure-tight metal shell hung into the cemented casing of a large-diameter well in which stagnant mud fills the annulus between said casing and an outer tubing concentric with two or three other tubings of smaller diameter, with the central tubing used for transporting to the surface the reservoir fluids produced, while the other tubings are used for downward flow of feed gases and water.

8. A Downhole catalytic Methanator reactor assembly according to claim 1, in which the entrance of said drainholes is located near the top of said assembly, to which it is connected through leak-proof connections.

9. A Downhole catalytic Methanator reactor assembly according to claim 1 in which the connection with said drainholes is through the bottom of said assembly, using a multiple-tubing completion packer.

10. A Downhole catalytic Methanator reactor assembly according to claim 1 wherein said feed gas is a Syngas mixture consisting primarily of Hydrogen and Carbon oxides.

11. A Downhole catalytic Methanator reactor assembly according to claim 1 wherein said feed gases are separate streams of Oxygen and Natural Gas.

12. A Downhole catalytic Methanator reactor assembly according to claims 1 or 11 wherein Syngas required for the catalytic Methanation reaction is made downhole by reacting Natural Gas and Oxygen, comprising:
    (a) a Partial Oxidation reactor section for making Syngas from Natural Gas, Oxygen and steam,
    (b) a water-cooled Quench section for rapidly cooling said Syngas, wherein said sections are both located within the upper part of the shell of said assembly, above the catalytic Methanator section and the valve section.

13. A Downhole Partial Oxidation reactor section, according to claim 12 comprising:
    (a) means for pre-heating said Natural Gas feed by heat exchange through the hot metal tubular shells within said assembly including those within said catalytic Methanator section,
    (b) means for partially oxidizing said pre-heated Natural Gas in the presence of steam in the hot flames of a plurality of down-firing vertical burners (c) perforated canisters surrounding each one of said burners, for distributing and mixing said Natural Gas, steam and Oxygen streams, into a reactive zone, (d) a ceramic heat shield enclosing said canisters for protecting the shell of said assembly from the flames heat.

14. A Quench section according to claim 12 wherein the effluent from said Downhole Partial Oxidation reactor section is cooled by impinging and flowing past coarse ceramic particles, cooled by a water stream, comprising:

a fixed bed of said ceramic packed on top of the fixed bed of said catalytic Methanator section, (b) metal tubes carrying cooling water or water-filled porous ceramic tubes or plates in contact with said ceramic particles arranged in a fixed bed surrounding said tubes or plates.

15. A catalytic Methanator section according to claims 12, 13 or 14 in which the Methanation catalyst is also effective for the water gas shift reaction, direct and reverse, and in which the flowing gas stream is at a temperature of less than 800 F. at the inlet, after its passage through said Quench section, and remains within this temperature range by heating and vaporizing water flowing in boiler-type metal tubes or exsuding from porous ceramic tubes or plates located within said catalytic bed.

16. A Downhole valve section, for cyclic steam and gas injection operations, with ports designed to be connected to the entrance of at least two substantially horizontal drainholes and with at least two other tubular connections, and presenting multiple tubular flow passages within a steel body, and including multi-way downhole retrievable valves, located within said flow passages, and operated from the surface, said valves being arranged so that the gaseous injectant can be switched from any one of said drainholes to any other, and so that the flow of reservoir fluids can be simultaneously or consecutively directed from any of the previously injected drainholes to a tubing dedicated to production through one of said tubular connections.

17. A multi-way downhole retrievable valve according to claim 16, designed to be attached to the wall of said flow passages, consisting of a body with at least 4 ports and of a sealed rotating ball with a diametrical passage, permitting fluids to flow either vertically or horizontally, depending on the motion of a surface-operated actuator rotating and rolling the ball in at least two sealing positions.

18. A multi-way downhole retrievable valve according to claim 16, designed to be attached to the wall of said flow passages, consisting of a body and of a hinged flapper capable of sealing on both of its faces, against either of two of three ports in the valve body, one with a vertical axis, the others with a horizontal axis; said flapper being pushed into either the horizontal or the vertical position by means of surface operated actuators, including a movable flow tube, sliding up and down vertically in the valve body and providing a secondary seal along its lower edge when in the down position.

19. A multi-way downhole retrievable valve according to claim 16, designed to be attached to the wall of said flow passages, consisting of a body and of a sliding mandrel with multiple transverse passages, positioned opposite multiple ports in the valve body to provide multi-way flow service; said mandrel's position being determined by actuators operated from the surface by hydraulic or electrical means.

* * * * *